United States Patent [19]

DelGuidice et al.

[11] Patent Number: 5,073,841
[45] Date of Patent: Dec. 17, 1991

[54] WIRE MANAGEMENT SYSTEM

[75] Inventors: Henry L. DelGuidice; George H. Foster, Jr., both of Winston-Salem; Michael G. Warren, North Wilkesboro, all of N.C.

[73] Assignee: AMP Incorporated, Harrisburg, Pa.

[21] Appl. No.: 476,202

[22] Filed: Feb. 7, 1990

[51] Int. Cl.⁵ .............................................. H02B 1/20
[52] U.S. Cl. ................. 361/428; 174/72 A; 361/427
[58] Field of Search ............ 174/72 A, 101; 361/428, 361/427, 429

[56] References Cited

U.S. PATENT DOCUMENTS

| | | | |
|---|---|---|---|
| 3,485,937 | 12/1969 | Caveney | 174/101 |
| 3,763,401 | 10/1973 | Ransom | 174/72 A |
| 4,654,967 | 4/1987 | Thenner | 174/72 A |
| 4,697,720 | 10/1987 | Hotchkiss et al. | 174/72 A |
| 4,758,924 | 7/1988 | Dillon et al. | 361/428 |

Primary Examiner—Gregory D. Thompson

[57] ABSTRACT

A wire management system is shown for systems such as cross-connect panels where the system includes a channel shaped member which has flexible fingers as part of the channel walls. This channel shaped member is inserted into a through hole of a panel and retained thereto via brackets which mount to the ends of the panels. The brackets also allow the channel shaped member to retract out of the panel to a position where cables to be managed can be inserted through the front of the panel, and is insertable into the panel to a position where the cables can be inserted from the rear of the panel.

2 Claims, 8 Drawing Sheets

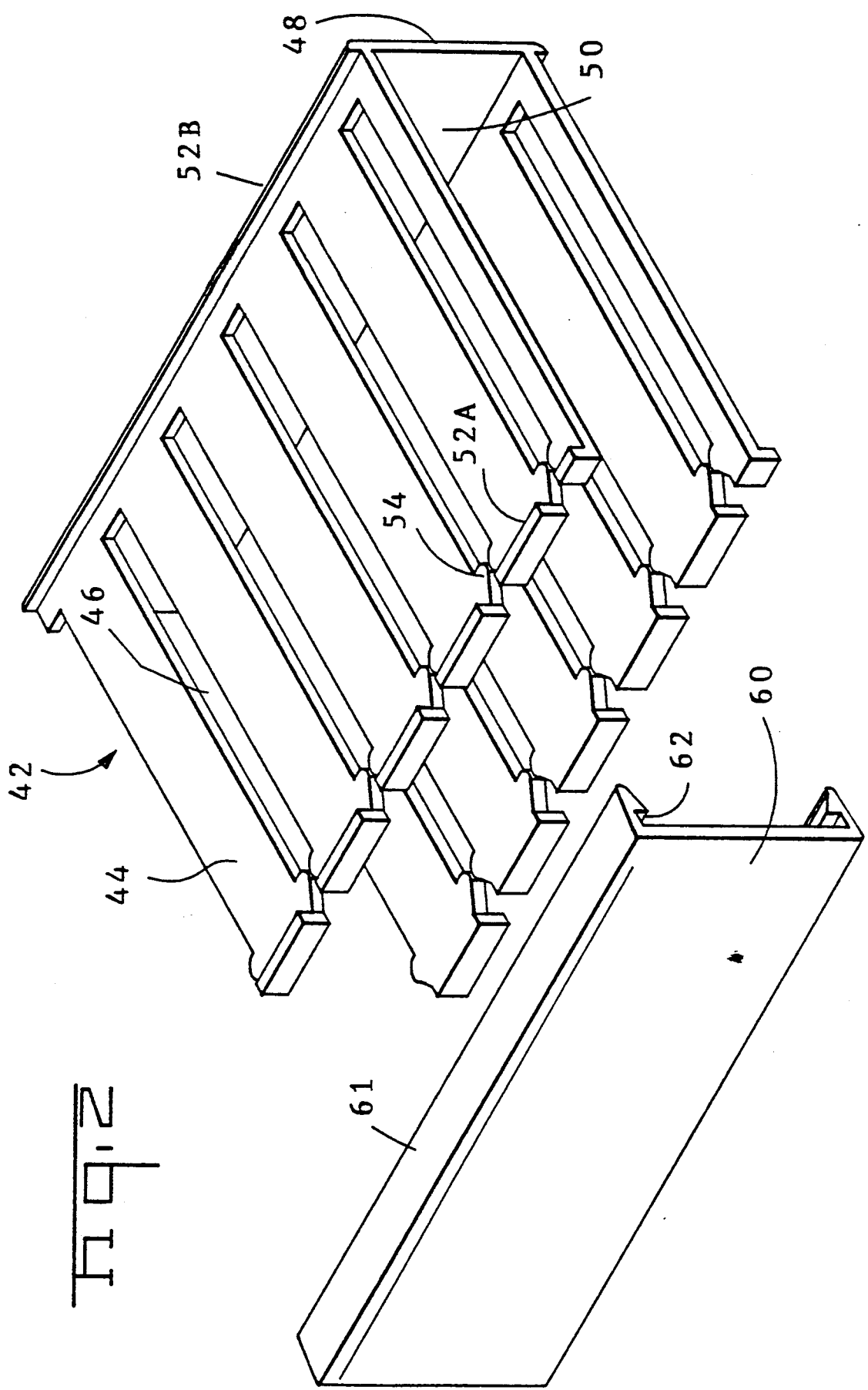

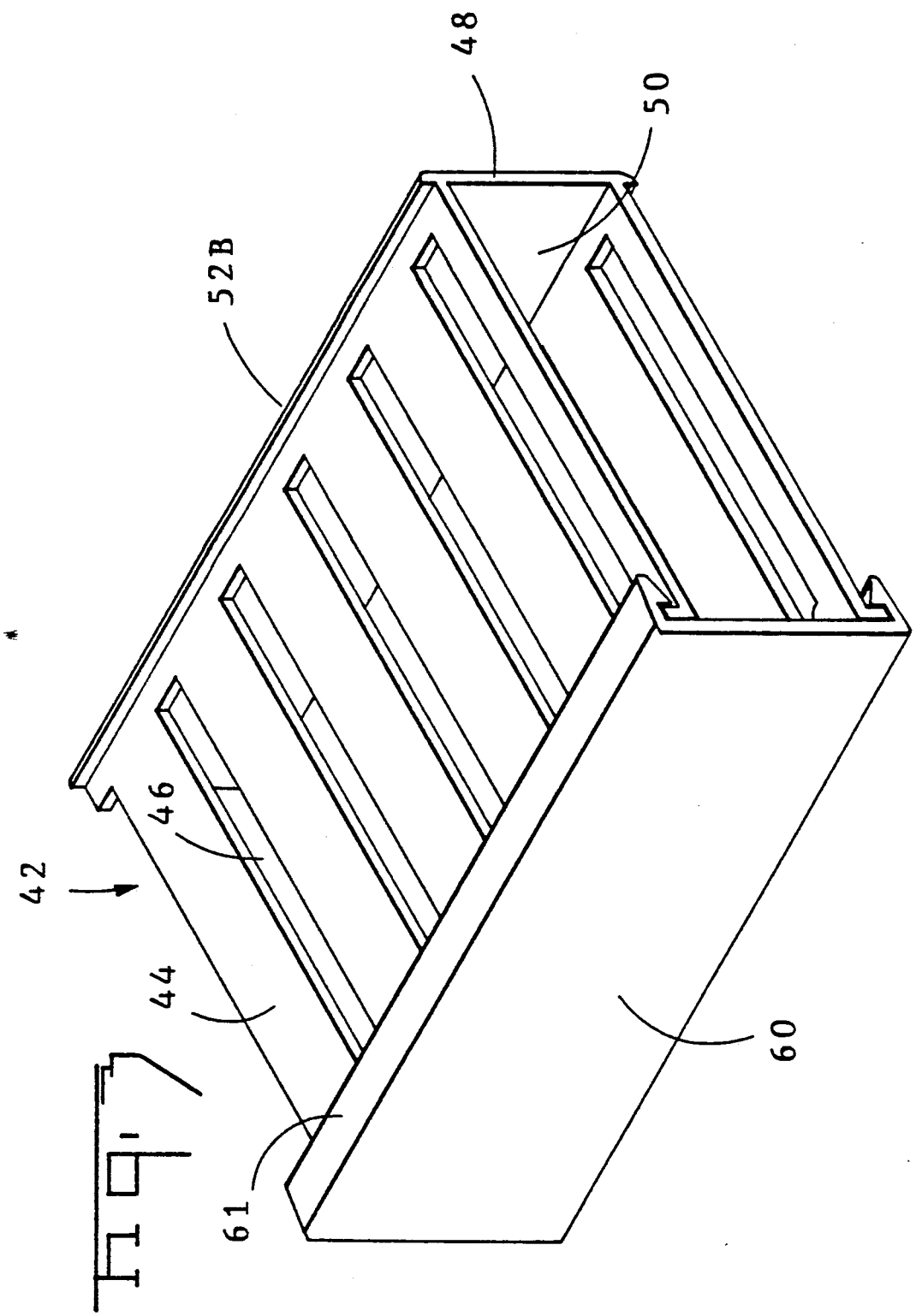

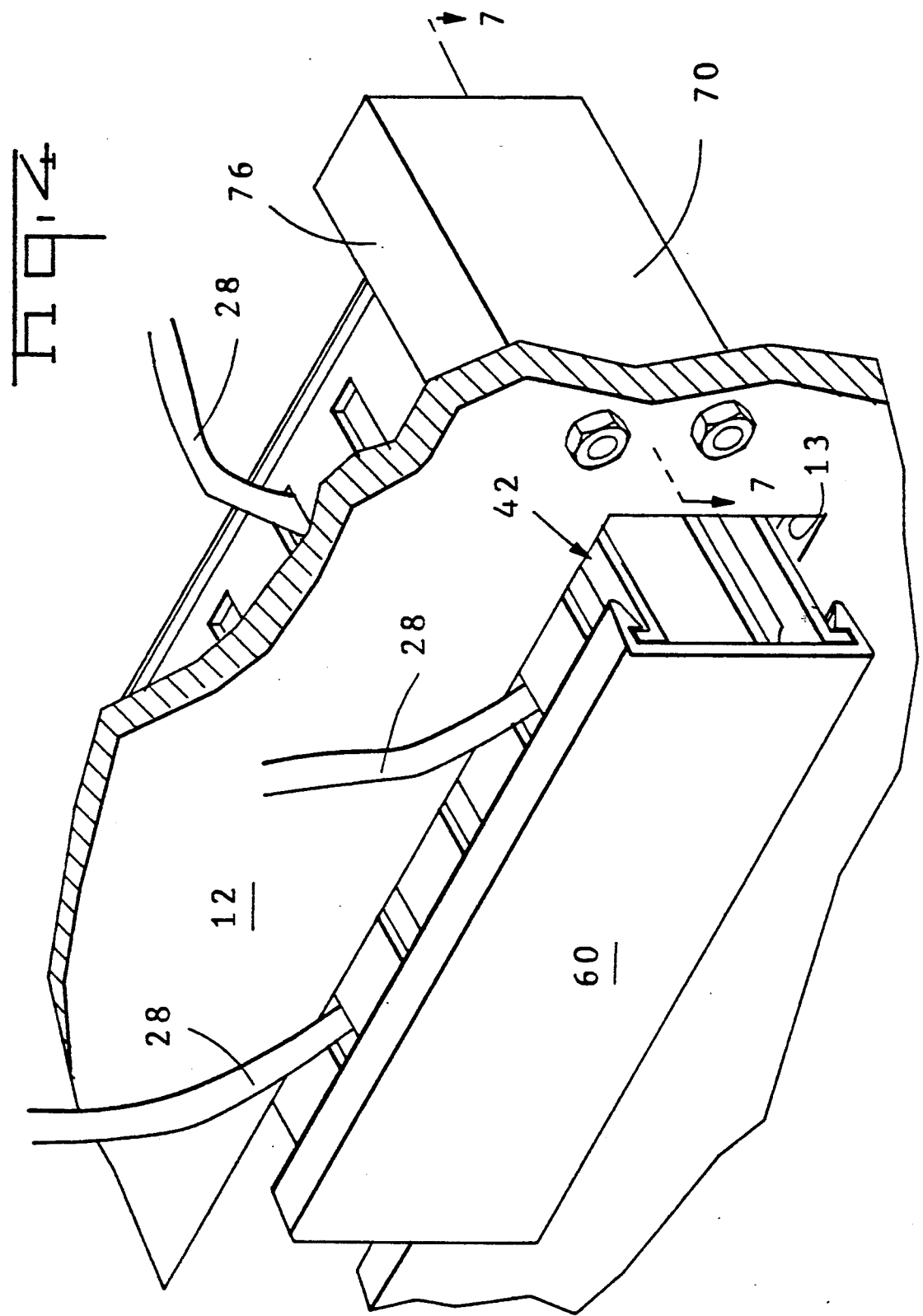

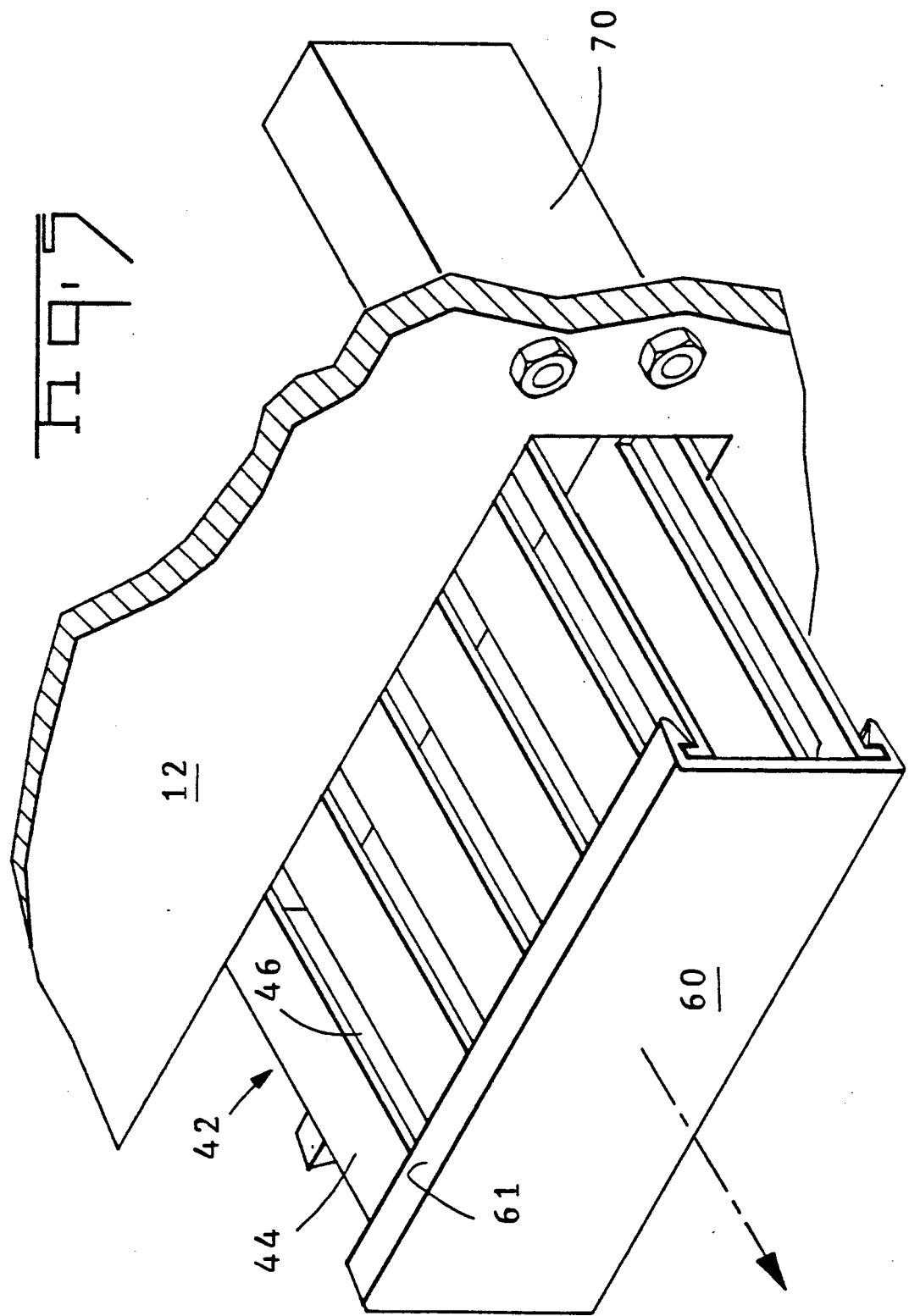

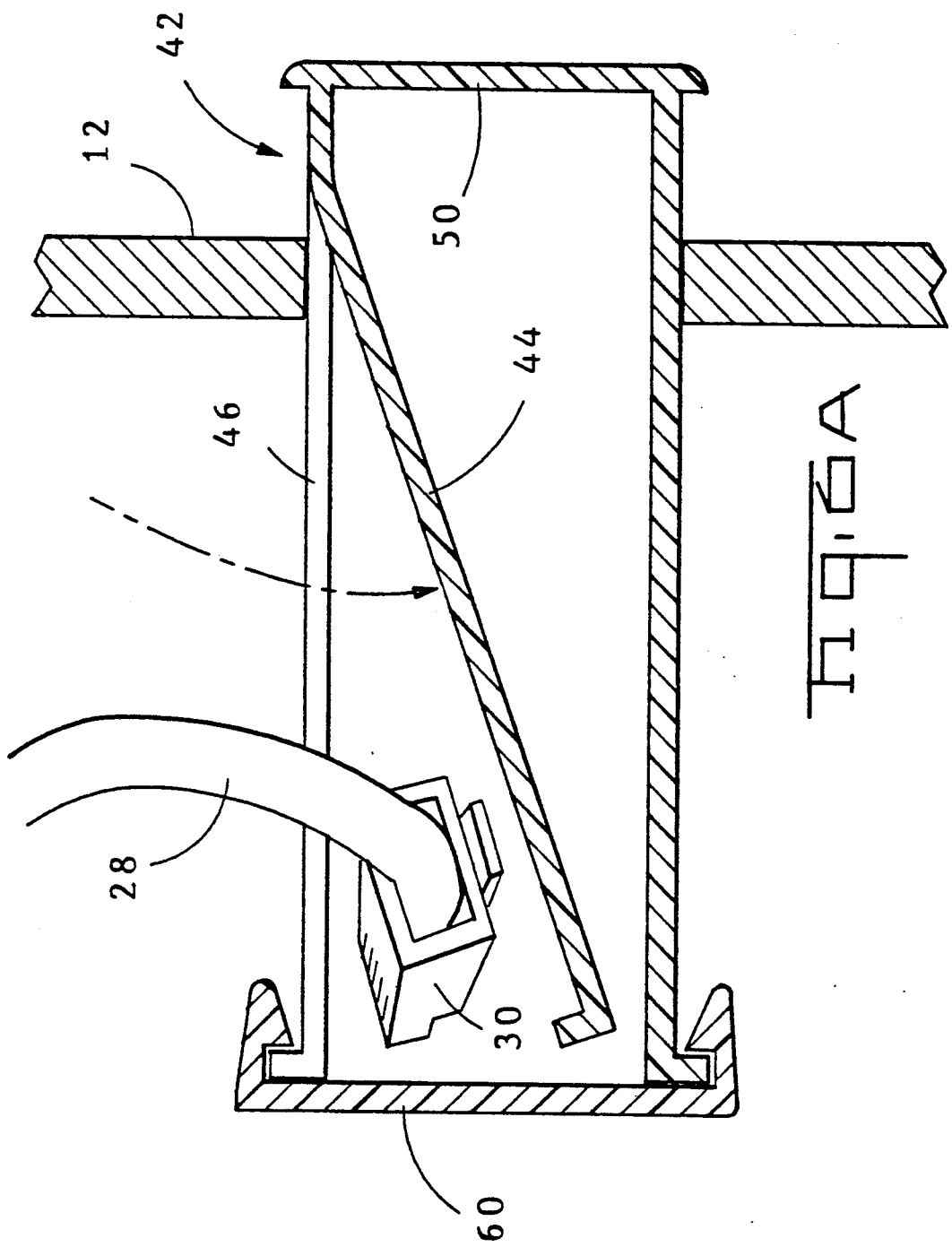

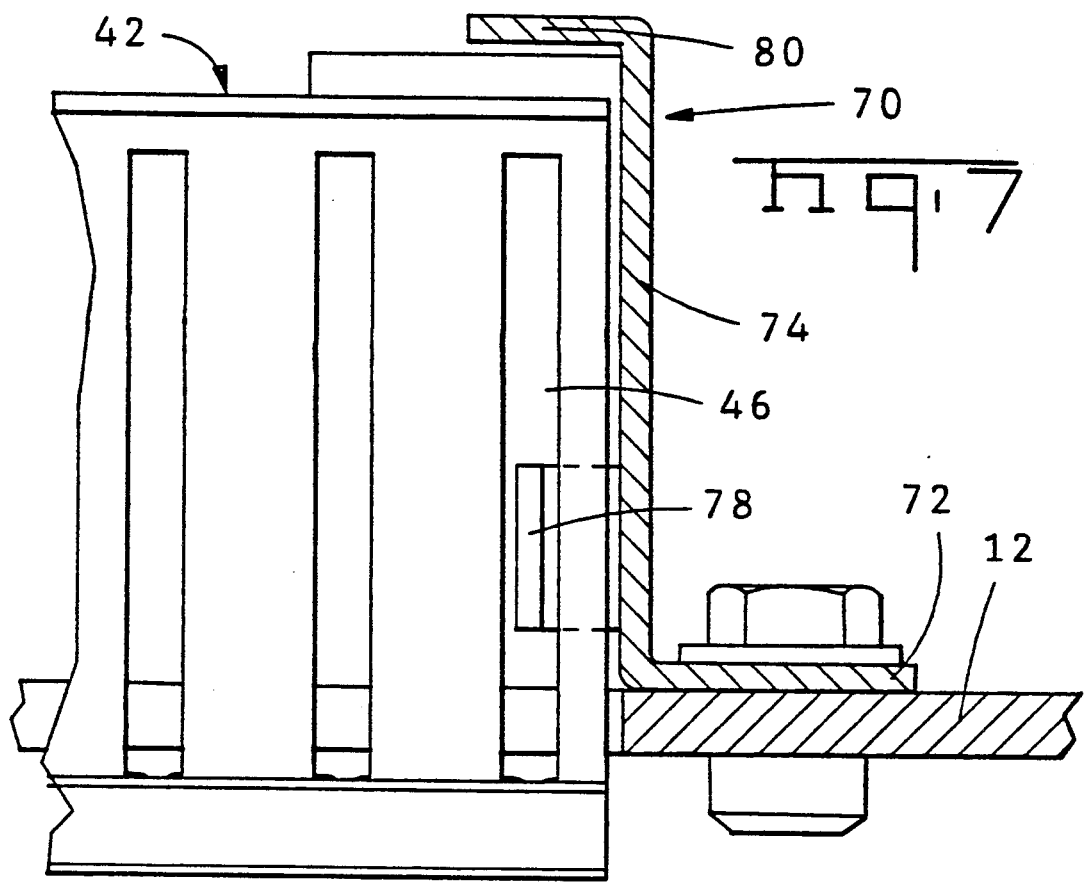
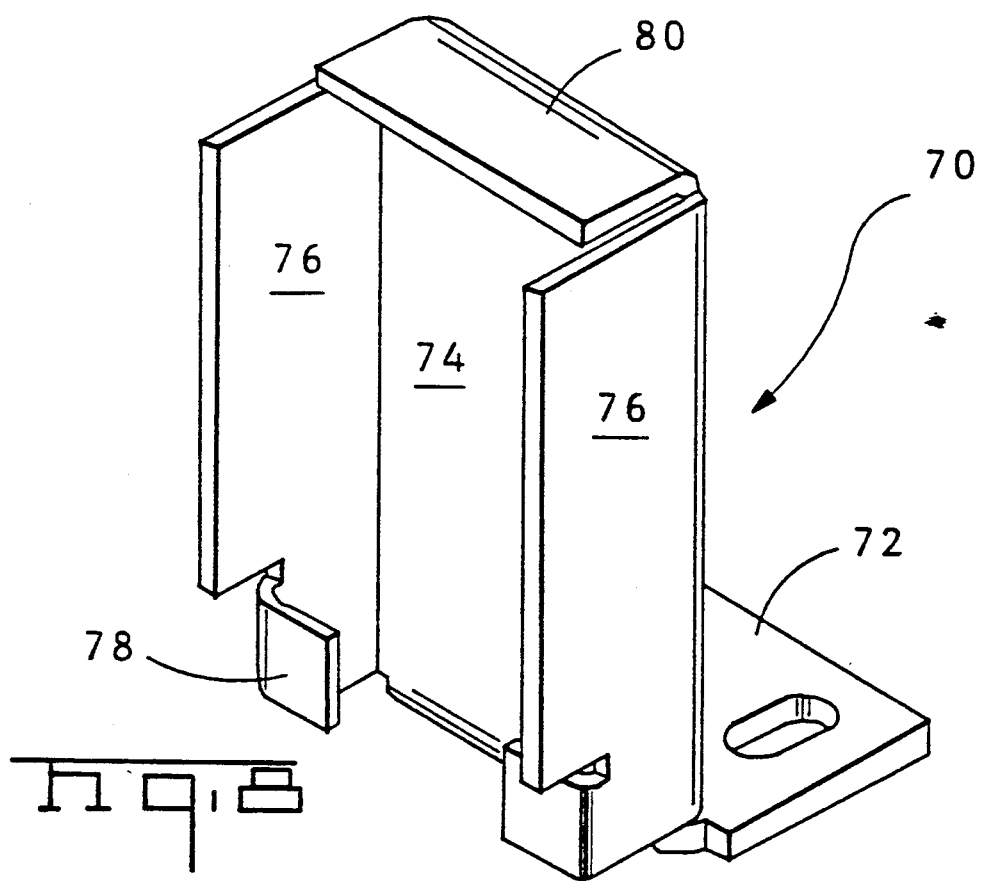

WIRE MANAGEMENT SYSTEM

BACKGROUND OF THE INVENTION

1. Field of the Invention

The present invention relates to a wire management system for the arrangement of a plurality of cables such as telephone and data cables in a cross-connect apparatus.

2. Description of the Prior Art

It is common practice in both the voice and data transmission industry to localize a plurality of interconnections for the voice and data transmission lines. For example, in the telephone industry, it is common practice for the plurality of lines which run to the telephone company to be localized in one area, and in the same area to have an interconnection to the individual work stations. In this manner, the telephone line from the telephone company can be interchangeably connected to the individual work stations without rewiring from the phone company connection to the work station. This type of localization is typically referred to as a cross-connect system where the cross-connection is that from the connection to the telephone company made to the connection for the individual work station. While the accumulation of these plurality of cables is desirable from an interconnection and changeability standpoint, when a large group of wires are accumulated in any one area, the wires are typically difficult to manage. A need has arisen in the voice and data communications industry to provide a wire management system to manage wires from both the front side of a panel which has components thereon and also to manage the wires on the rear side of the panel.

U.S. Pat. No. 3,485,937 shows a wiring duct and a cover member where the duct includes flexible finger members 30 extending from each edge of a base section 20 where the fingers receive therebetween a plurality of cables such as 12. The cables 12 could run straight through the opposed spacing between the fingers or could be fed through the duct member and later through a further opening. Typically, this type of system is fixedly mounted such that the base is rigid relative to a wall.

SUMMARY OF THE INVENTION

It is an object of the invention then to design a wire management system whereby cables and wires can be managed from both the front and the rear of a panel, and can communicate with both the front and the rear of the panel.

The object of the invention was accomplished by designing a wire management system having a panel section with a through opening therethrough, bracket means adjacent to the ends of the opening, and channel means assembled to the bracket means and installed through the opening. The channel means includes a plurality of resilient flexible fingers providing access to the channel internal passageway. The channel means is retractably moveable from a position adjacent to the panel, where cables can be inserted into the passageway from the rear of the panel section, to a retracted position where cables can be inserted into the channel internal passageway from the front of the panel section.

BRIEF DESCRIPTION OF THE DRAWINGS

FIG. 2 is a perspective view of the wire management channel and cover exploded away from each other.

FIG. 3 is a perspective view similar to that of FIG. 2 showing the cover in place over the channel.

FIG. 4 is a perspective view showing the channel and cover in within a panel.

FIG. 5 is similar to that of FIG. 4 showing the channel in a fully retracted position.

FIGS. 6A and 6B are cross-sectional views through the panel and through the channel, respectively showing the insertion of the connector into the channel.

FIG. 7 is a cross-sectional view through lines 7—7 of FIG. 4.

FIG. 8 is a perspective view of the bracket which retains the channel in a slideable configuration to the panel.

DETAILED DESCRIPTION OF THE PREFERRED EMBODIMENT

Figure 1:
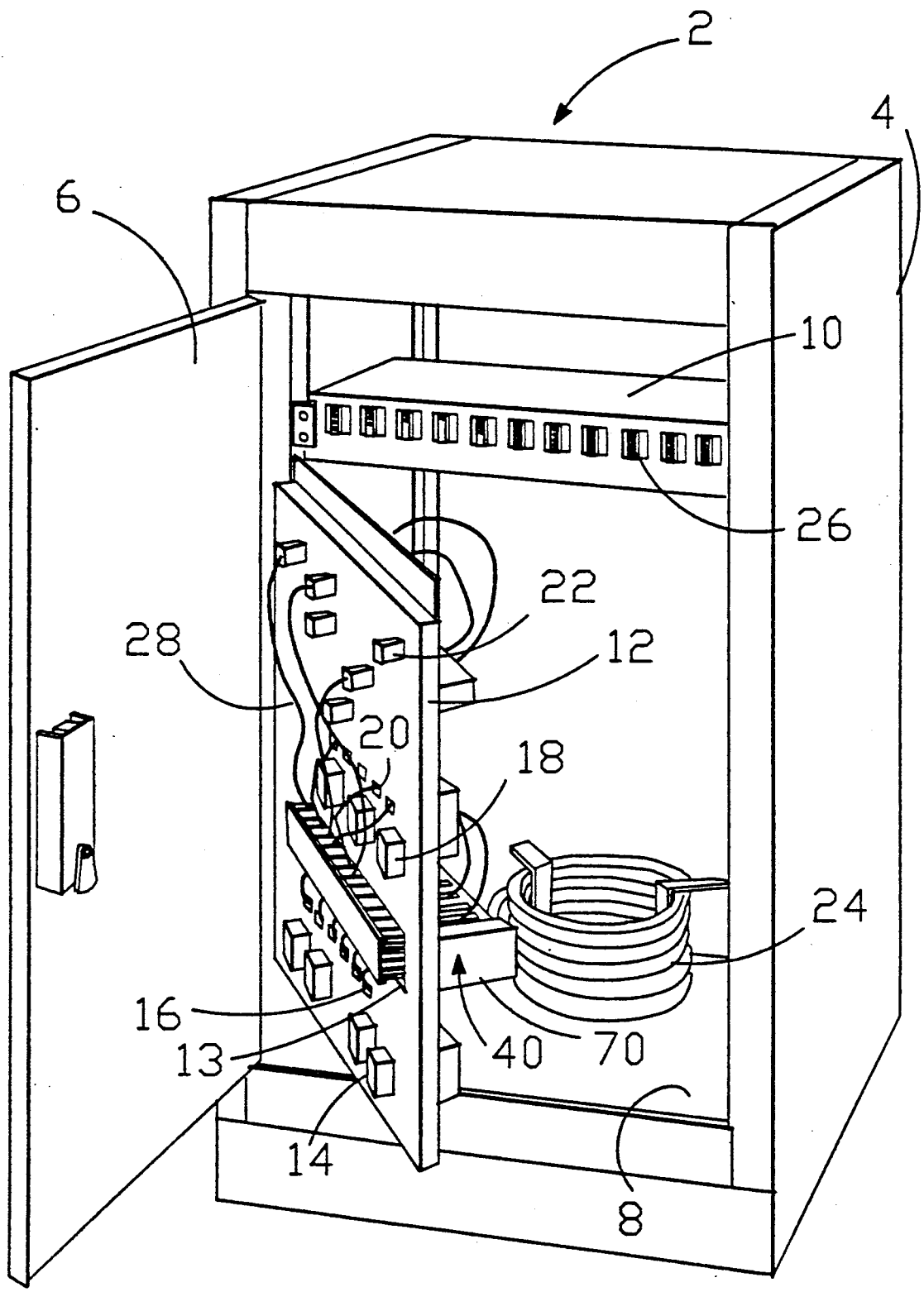
FIG. 1 is an isometric view of a local panel for voice and data interconnection showing the rotatable door partially opened to show the internal structure of the panel.

With reference first to FIG. 1, a local work station 2 is shown as comprising a cabinet 4 having a swinging door 6 which closes off the cabinet and having mounted therein a swinging panel 12 having connections 14, 16, 18, 20 and 22 mounted thereon. The cabinet 2 further comprises data cable 24 entering through the base 8 of the cabinet 2. Also mounted to the swinging panel 12 is a wire management system 40 which allows for the management of the cables 28 from either the front side or the rear side of the panel 12. With reference now to FIGS. 2 through 8, the wire management system 40 will be described in greater detail.

As shown in FIG. 2, the wire management system 40 first comprises a channel member 42 having a base section 48 with a plurality of flexible finger members 44 extending from the base section defining slots 46 between adjacent pairs of flexible fingers 44. At the ends of the fingers 44 are tab sections 54, which together with an adjacent tab section, provide for a stop surface to prevent wires inserted in the slots 46 from escaping through the slot. The channel 42 further comprises a through passageway 50 between the rows of resilient fingers for receipt of cable therethrough and also includes forward and rearward flange sections 52A and 52B. Also shown in FIG. 2 is a cover member 60 having lips 61 which latch to the forward flanges 52A via the latch surfaces 62 on the cover member 60, to a position shown in FIG. 3.

In the preferred embodiment of the invention, the channel member 42 and the cover 60 are slideably mounted to the front panel as shown in FIG. 1 via two bracket members 70 which are shown in greater detail in FIG. 8. Each bracket member 70 comprises a mounting flange 72, a base section 74, sidewalls 76 and a stop surface 80. Guide tabs 78 are formed by shearing a portion of sidewalls 76 and folding the sheared section inwardly.

Figure 6B:
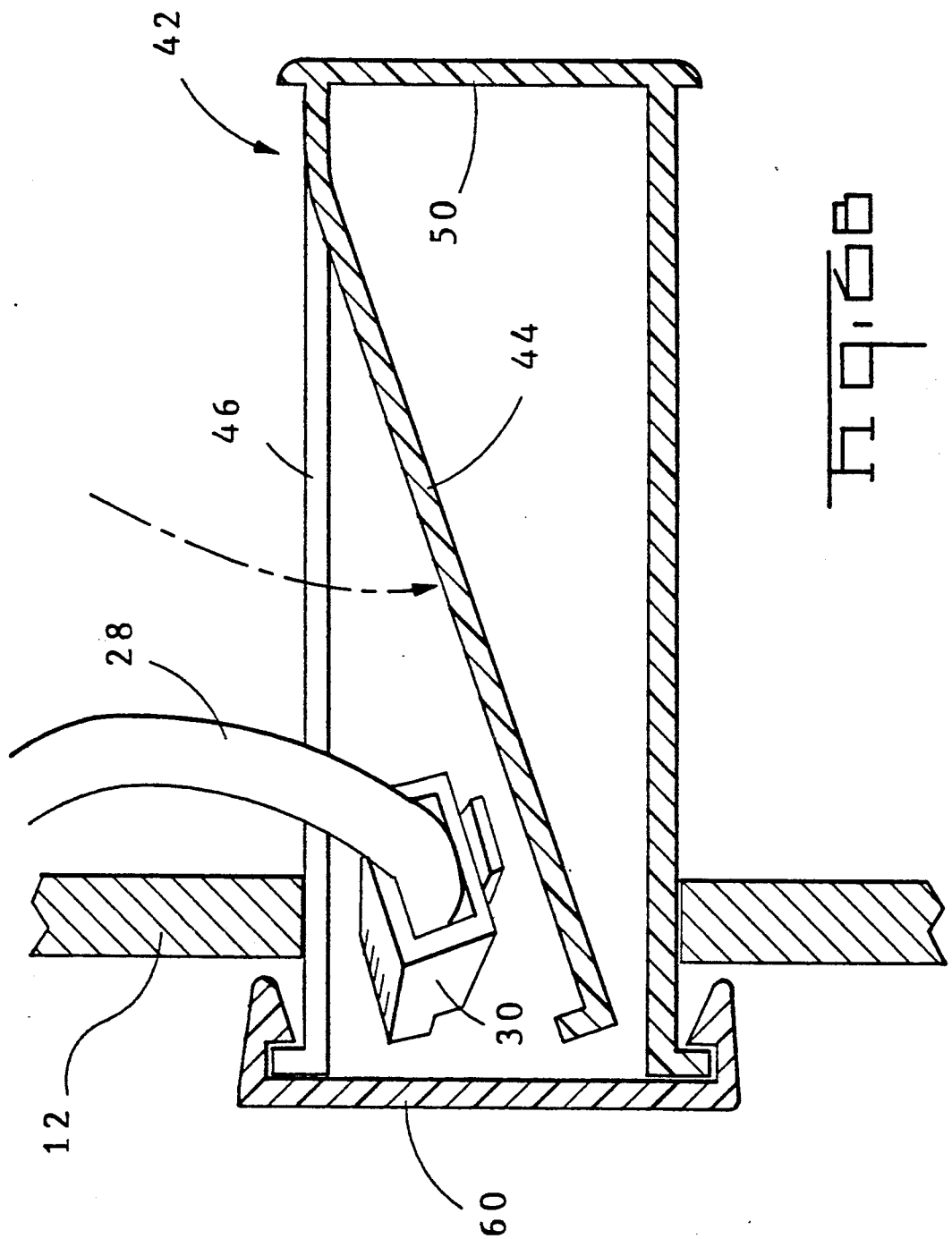

To install the wire management assembly 40 to a panel 12, a panel cut-out 13 is formed of a desirable length, and having a height which is larger than the height of the resilient fingers but less than the distance between the flanges at the ends as shown in FIGS. 6A and 6B, in order that the channel can move inwardly and outwardly relative to the panel yet be retained by the forward and rearward flanges 52A and 52B respectively. The channel member 42 can be cut to a desirable length and assembled to the end brackets such that the guide tabs 78 project into an end slot 46 as shown in FIG. 7. The brackets and the channel 42 are then inserted from the rear side of the panel and the brackets 70 are fixedly mounted to the panel 12 via conventional hardware such as a threaded bolt and nut.

The utility of the wire management assembly 40 will be described relative to FIGS. 6A and 6B. As shown in FIG. 6A, if a wire is to be managed which is on the front side of the panel 12, the channel 42 can be pulled forward and the resilient finger 44 deflected towards the lower row of fingers 44 such that the connector 30 and cable 28 are inserted into the channel where the connector 30 and cable 28 can either be projected through the opposed slot or can be inserted into the channel passageway 50 to move the cable and connector laterally of its present position. The cable 28 can either be dressed through the rear side of the panel, or it can be brought through the lower row of fingers to a new lateral position on the front of the panel.

With respect now to FIG. 6B, if a cable 28 is to be managed which is on the rear side of the panel 12, the channel 42 is pushed forward to its fully inserted position and the resilient finger 44 is once again depressed and the connector 30 is again installed through the slot in a similar manner. It should also be noted that the connectors and cables 30, 28 can move laterally through the channel passageway 50 and exit on opposite sides of the panel or on the same side of the panel, adding to its utility.

It should be appreciated that the above mentioned assembly has been found particularly useful where the panel includes cables running on both the front and rear side thereof. This assembly can manage a plurality of cables dressed on both sides of the panels and can allow wires and cables to be neatly run from the front to the rear, and visa versa, without the need for the wires to be dressed through an opening in the panel.

We claim:

1. A wire management panel comprising:

a panel section having a through opening therethrough;

bracket means adapted to be secured to the panel section adjacent to the opening; and channel means assembled to the bracket means and installed through the opening, the channel means including a plurality of resilient flexible fingers defining a plurality of slots therebetween, said slots providing access to the channel internal passageway, the channel means being retractably moveable from a position adjacent to the panel, where cables can be inserted into the passageway from the rear of the panel section, to a retracted position where cables can be inserted into the channel internal passageway from the front of the panel section.

2. The wire management panel of claim 1 wherein the bracket means have channel sections which are adapted to retain the channel means to the panel sections, yet allow for the channel means to be retractably moveable.

* * * * *